United States Patent [19]

Moser et al.

[11] Patent Number: 5,220,821

[45] Date of Patent: Jun. 22, 1993

[54] METHOD OF DETECTING KNOCK IN INTERNAL COMBUSTION ENGINES

[75] Inventors: Winfried Moser, Ludwigsburg; Thomas Brosi, Sulzbach/Murr, both of Fed. Rep. of Germany

[73] Assignee: Robert Bosch GmbH, Stuttgart, Fed. Rep. of Germany

[21] Appl. No.: 746,102

[22] Filed: Aug. 15, 1991

Related U.S. Application Data

[63] Continuation-in-part of Ser. No. 449,893, Dec. 4, 1989, abandoned.

[51] Int. Cl.$^5$ .............................................. G01L 23/22
[52] U.S. Cl. ................................................................ 73/35
[58] Field of Search ..................................................... 73/35

[56] References Cited

U.S. PATENT DOCUMENTS

| | | | |
|---|---|---|---|
| 3,678,732 | 7/1972 | Arrigoni et al. | 73/35 |
| 4,565,087 | 1/1986 | Damson et al. | 73/35 |
| 4,762,106 | 8/1988 | Blauhut | 73/35 |

Primary Examiner—John E. Chapman
Attorney, Agent, or Firm—Michael J. Striker

[57] ABSTRACT

To detect knock, a detected signal relating to a combustion property in a cylinder of an engine is generated. The detected signal (I) is filtered to select those portions characteristic of knock. However, the filtered signal (I') is only investigated to determine whether knock has occurred, when the unfiltered detected signal (I) meets at least two, and usually four, preset conditions. One preset condition is that the detected signal (I) must have reached a predetermined threshold value ($I_s$). Other preset conditions for the detected signal include the following: that the maximum value ($I_{max}$) of the detected signal (I) is below a predetermined critical value ($I_{max\ crit}$) and that within a predetermined crank angle difference ($\Delta\alpha_F$), after reaching the threshold value ($I_s$), during a predetermined time interval ($\Delta t$) the detected signal (I) does not decrease by more than a first critical amount ($\Delta I_{AbC}$) and then does not rise by more than a second critical amount ($\Delta I_{AnC}$).

7 Claims, 2 Drawing Sheets

METHOD OF DETECTING KNOCK IN INTERNAL COMBUSTION ENGINES

This application is a continuation-in-part of application Ser. No. 449,893, filed Dec. 4, 1989, which has been abandoned.

The present invention relates to detection of knock in an internal combustion engine.

BACKGROUND OF THE INVENTION

Known methods of detecting knock include measurement of a pressure in, or sound from, the engine cylinders by appropriate detectors. However, it is difficult to distinguish signals produced by knock from other sounds which occur normally in the engine, and those methods are therefore usually unsatisfactory.

During detonation of a fuel/air mixture in a cylinder of an engine, ions are produced and an ionic current can be detected by measuring the current across a probe gap (e.g. conveniently provided by the gap between the electrodes of a spark plug in the cylinder) as described in the article "Studies of Engine Combustion Processes by Ionization Current" by K. Iinuma in Bull. of JSME, Vol. 4, No. 14, pages 352 to 357, 1961.

When knock is produced by a combustion event in a cylinder of an engine, high-frequency oscillations are generated in the ionic current. These oscillations, which can also be generated by events other than knock, can be filtered and then interpreted to determine whether they contain features which are characteristic of knock.

For example, rotation of the engine distributor can lead to spark-overs in the distributor (due to residual energy in the ignition coil) even after decay of the ignition voltage. The spark-overs can cause diodes in the measuring circuit to switch over from a blocking state to a conducting state, producing a steep signal rise. The steep signal rise includes many frequencies, including those which are the same as those associated with knock. Interference thus occurs, and it is often impossible to determine whether certain characteristics of the filtered signal result from knock.

SUMMARY OF THE INVENTION

It is an object of the present invention to provide a method of detecting knock which is free from interference and spurious signals so that knock events may be more accurately detected and recorded.

According to the present invention, the method of detecting knock in an internal combustion engine includes generating a detected signal related to a property of fuel combustion, particularly an ionization current across a probe in a cylinder, in at least one cylinder, filtering the detected signal to form a filtered signal which may contain signal components that have characteristics associated with knock and evaluating the filtered signal to determine the occurrence of knock only when the detected signal, from which the filtered signal is obtained, meets, within a range of crank angles dependent on the conditions of the detected signal, at least two preset conditions, one of which is that the detected signal has reached a predetermined threshold value.

The other of the preset conditions may be any of the following conditions:

1. that within a predetermined crank angle difference, after reaching the threshold value of the unfiltered detected signal and during the predetermined time period, $\Delta'$, the detected signal does not decrease by more than a first critical amount and then does not rise by more than a second critical amount;

2. that a maximum value of the detected signal is below a predetermined critical value;

3. that an instant crank angle when the detected signal reaches the threshold value is less than a predetermined critical crank angle; and 4. that another crank angle difference between between the instant crank angle at which the detected signal reaches the threshold value and another instant crank angle at which the detected signal returns to the threshold value is greater than a predetermined critical crank angle difference.

Of course, the detected signal from more than one engine cylinder is advantageously investigated, filtered and the filtered signal evaluated according to the present invention for more than one, and indeed all, of the cylinders of the engine so that the occurrence of knock in the entire engine can be studied.

Usually all of the above preset conditions are used to investigate the detected signal.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF THE PREFERRED EMBODIMENTS

Figure 1:
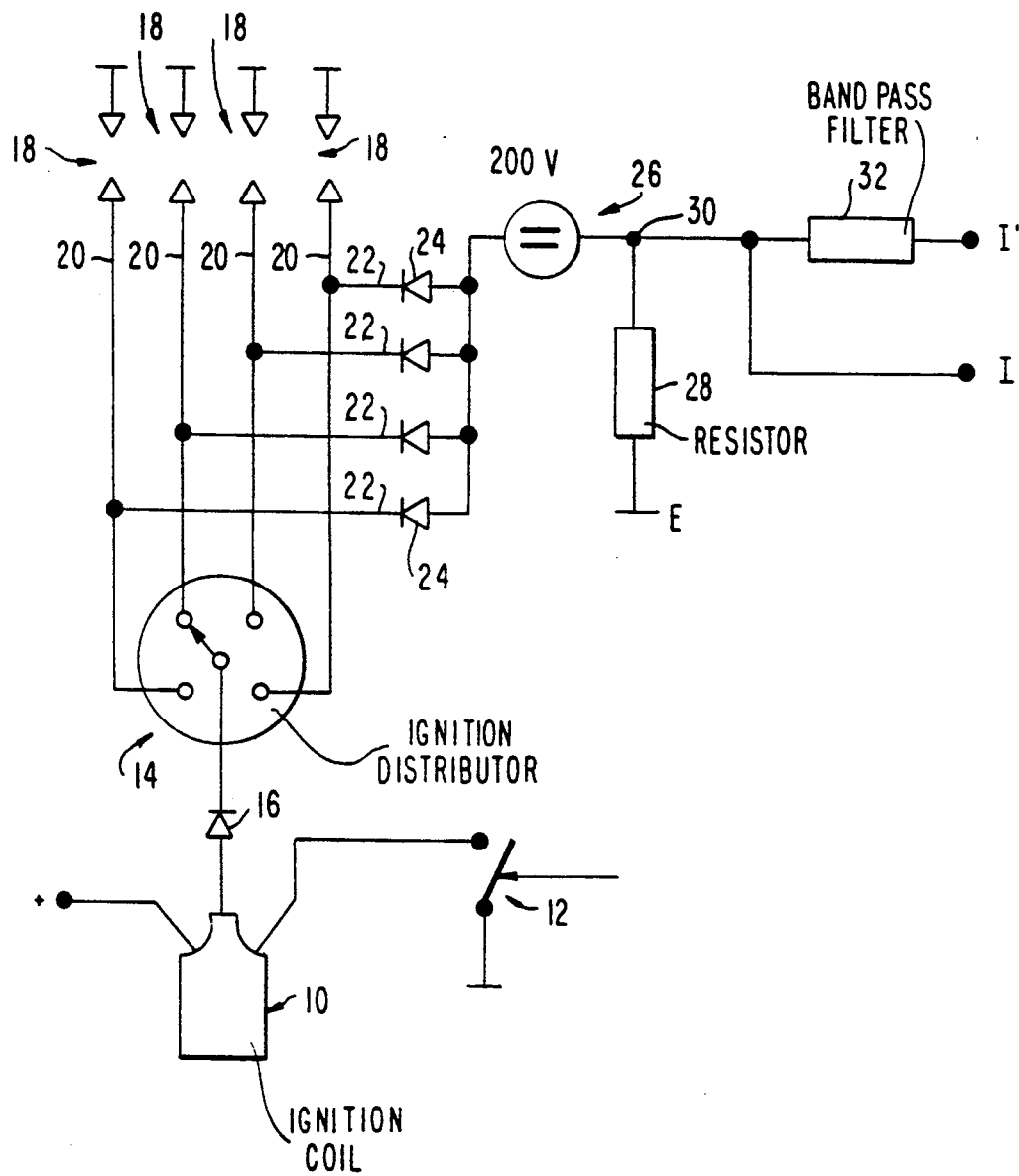
FIG. 1 is a block diagram of an ignition apparatus to which the method of the present invention is applicable.

An ignition apparatus used in a motor vehicle is shown in FIG. 1. The method of the invention is applicable to this apparatus which comprises an ignition coil 10, contact breaker 12, ignition distributor 14 connected to the coil via a diode 16 and four spark plugs 18 connected to the distributor 14 by high-voltage leads 20. The high-voltage lines 22 are connected to a common output, via respective diodes 24, to a source 26 having a potential difference of 200 v, which biases forward the diodes 24. The output of the source is connected to earth E by a resistor 28.

Upon ignition of the fuel/air mixture in any one of the cylinders, ions are formed in the cylinder, and following the decay of the ignition voltage of the associated spark plug, the associated diode 24 becomes temporarily conductive in its reverse direction, thus allowing an ionization current to flow, which can be measured between an output 30 and earth E.

Figure 2A:
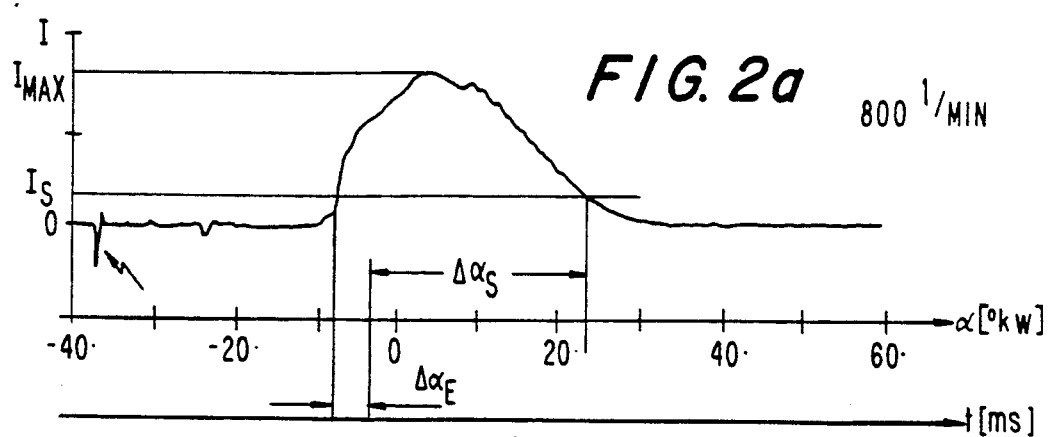
FIGS. 2a and 2b are, respectively, graphical illustrations of the relationship of the detected(unfiltered) ionization current and filtered ionization current in a cylinder of an engine and the crank angle when there are no spurious signals present.
Figure 2B:
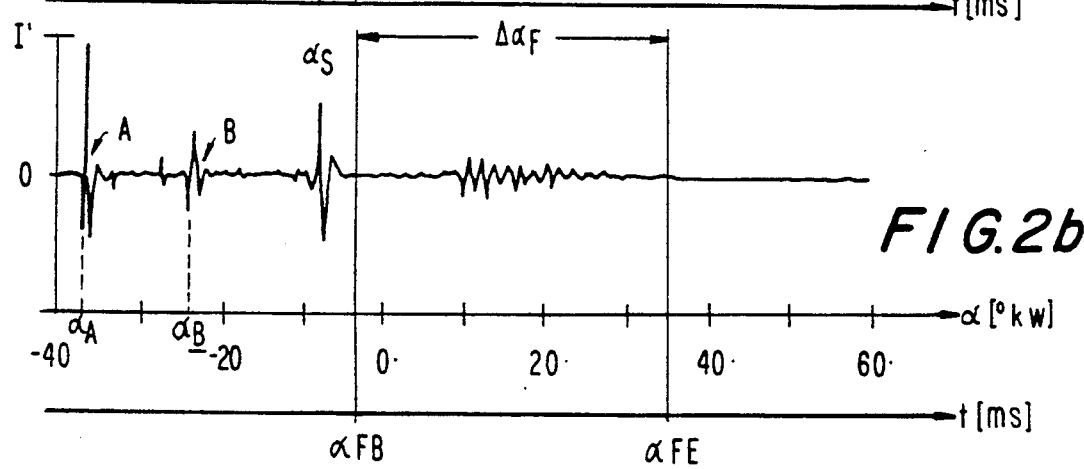

A typical measured ionization current(i.e. the detected signal) I obtained in this way is shown in FIG. 2a versus crank angle ($\alpha$). Of course, when engine speed is fixed, there is a simple proportional relationship between crank angle and time, so a time axis is also shown. However, when the engine speed is varying, the units on the time axis shown in FIG. 2a would be constantly changing size. The detected signal I(i.e. the measured ionization current) is fed through a bandpass filter 32, which passes only those frequencies which occur during a knock event (whether or not they are, in fact, due to knock), and the resultant graph of filtered signal I'(filtered measured ionization current) taken with respect to a crank angle is shown in FIG. 2b. Typical frequencies are between 5 kHz and 20 kHz.

At a crank angle $\alpha_s$, when the unfiltered ionization current I reaches threshold value $I_s$, a crank angle sampling window $\Delta\alpha_F$ in which the filtered signal is sampled is set up. Firstly, a predetermined crank angle increment $\Delta\alpha_E$ (corresponding to the filter transient time) is allowed to elapse, whereupon the crank angle sampling window itself begins at $\alpha_{FB}$. The unfiltered ionization current I is sampled again to ensure that it is still greater than $I_s$ within a predetermined crank angle limiting range $\Delta\alpha_{s\ crit}$, i.e. that $\Delta\alpha_s$(the difference between the instant crank angle when the unfiltered signal returns to the threshold value $I_s$ and the instant crank angle $\alpha_s$) $> \Delta\alpha_{s\ crit}$. Assuming that the ionization current I is still above the threshold value $I_s$ within that crank angle range, the filtered ionization current I' is then evaluated and investigated in the crank angle sampling window $\Delta\alpha_F$ which starts and $\alpha_{FB}$ and ends at $\alpha_{FE}$. Alternatively, if $\Delta\alpha_s < \Delta\alpha_{s\ crit}$, the filtered signal (I') is not evaluated and the next instance for which $\Delta\alpha_s > \Delta\alpha_{s\ crit}$ is tested within the cycle. The filtered ionization current I' over the sampling window $\Delta\alpha_F$ is checked for knock events in a known way (i.e. whether the peak value of rectified or integrated signal exceeds a critical value) to determine whether knock has occurred. In the present example shown in the drawing knock has, in fact occurred.

It will be noted that two other noticeable perturbations A and B occur in the filtered signal I'(filtered ionization current). However, no sampling window is set up for either of these events, since the corresponding detected(unfiltered) signals $I_A$ and $I_B$ at crank angles $\alpha_A$ and $\alpha_B$ do not reach the threshold value $I_s$. By stipulating that the detected signal I(unfiltered current) must reach a certain threshold value prior to evaluation of the filtered signal I', two spurious investigations of the filtered signal I' are avoided.

Figure 3A:
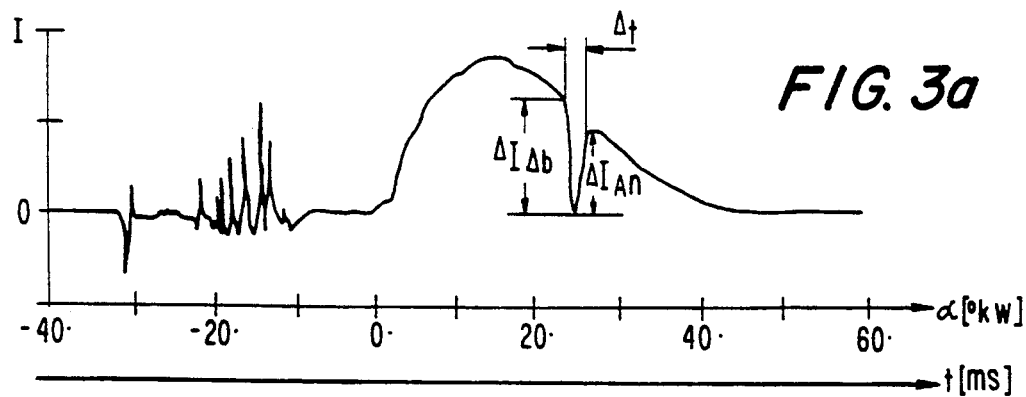
FIGS. 3a and 3b are, respectively, graphical illustrations of the detected(unfiltered) ionization current and filtered ionization current in a cylinder of an engine and the crank angle when there are spurious signals interrupting the signals from the normal combustion events and knock.

During the period that the filtered signal I' is investigated, the detected signal I(unfiltered ionization current) is checked for sharp discontinuities, and particularly for signal interruptions, indicative of events other than knock. In particular, the detected(unfiltered) signal I is checked to determine whether within a predetermined and comparatively short period of time $\Delta t$(which is less than a critical time period $\Delta T$), any decrease $\Delta I_{Ab}$ in the detected signal I is greater than a critical value $\Delta I_{AbC}$, and then whether the detected signal I increases again by an amount $\Delta I_{An}$ which is greater than a critical amount $\Delta I_{AnC}$. This is illustrated in FIG. 3a, in which such conditions are fulfilled, and hence the sample window is discontinued.

The above preset conditions on the detected signal I are important, since the rotation of the distributor 14 can lead to spark-overs in the distributor (due to residual energy in the ignition coil) even after decay of the ignition voltage at the spark plugs 18 and leads 20. The voltage in the leads 20 is thus increased briefly again and the high-voltage diodes 24 move from their conducting state to their blocking-state, resulting in a signal interruption in the measuring circuit. The interruptions are independent of the occurrence of knock, they can cause interference in the band-passed filtered signal I' because of their steep gradients.

The detected signal( unfiltered ionization current) I is also checked to ensure that the signal maximum $I_{max}$ is below a critical value $I_{max\ crit}$. Also, the instant $\alpha_s$ at which the ionization current I exceeds the threshold value $I_s$ is checked to ensure that it is before a critical value $\alpha_{s\ crit}$. Furthermore, as stated above, it is checked to see whether the time interval $\Delta\alpha_{s\ crit}$ (the crank angle range between the current reaching and returning to threshold value $I_s$) is reached.

If any of the four conditions are not met, knock detection for that combustion event is usually, but not always, impossible. However, the detected signal must always rise above the threshold $I_s$ for a satisfactory knock detection. If any of the above conditions exceeds a certain frequency of occurrence, a diagnostic signal is sent to trigger safety functions, for example to reduce the charging pressure of a turbocharger or to adjust the angle of ignition.

It is also possible, instead of measuring the ionization current, to measure the radiant emittance which occurs during combustion. Then the detected radiant emittance becomes the detected signal. The filtered and unfiltered electrical signals from the radiant emittance detectors could then be processed in the same way as described above.

Figure 3B:
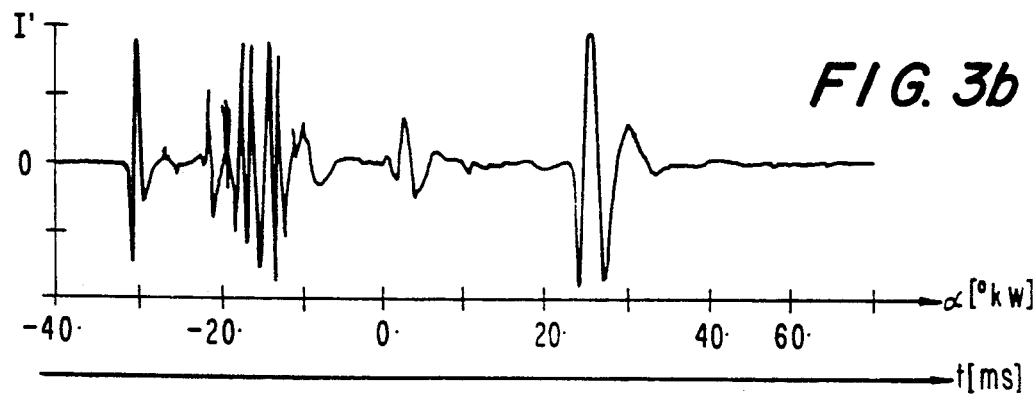

The abscissa in FIGS. 2 and 3 shows the crank angle $\alpha$ in degrees(°). A time axis has also been drawn paralleling the crank angle axis, because crank angle can be converted to time at fixed engine speed. However, the size of the units of the t axis must change with changing engine speed.

While the invention has been illustrated and described as embodied in a method of detecting knock in an internal combustion engine, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

1. A method of detecting knock in an internal combustion engine having a plurality of cylinders, said method comprising the steps of generating a detected signal (I) related to a property of a fuel combustion in at least one cylinder; filtering the detected signal (I) to form a filtered signal (I') which may contain signal components that have characteristics associated with knock; investigating the course of the detected signal (I) to determine if the detected signal (I) meets at least two preset conditions, wherein one of said preset conditions is that the detected signal (I) has reached a predetermined threshold value ($I_s$); and the other is, that, after reaching said threshold value ($I_s$), during a predetermined time period ($\Delta t$) the detected signal (I) does not decrease by more than a first critical amount ($\Delta I_{AbC}$) and then does not rise by more than a second critical amount ($\Delta I_{AnC}$) and, only if said preset conditions of the detected signal (I) are met, then evaluating the filtered signal (I') over a predetermined crank angle range ($\Delta\alpha_F$) dependent on said preset conditions of the detected signal (I) to detect knock.

2. A method as set forth in claim 1, wherein another of said preset conditions is that a maximum value ($I_{max}$) of the detected signal (I) is below a predetermined critical value ($I_{max\ crit}$).

3. A method as set forth in claim 1, wherein another of said preset conditions is that an instant crank angle ($\alpha_s$), when the detected signal (I) reaches the threshold value ($I_s$), is less than a predetermined critical crank angle ($\alpha_{s\ crit}$).

4. A method as set forth in claim 3, wherein another of said preset conditions is that a crank angle difference ($\Delta\alpha_s$) equal to another instant crank angle at which the detected signal returns to the threshold value ($I_s$) minus the instant crank angle ($\alpha_s$) at which the detected signal (I) reaches the threshold value ($I_s$) is greater than a predetermined critical crank angle difference ($\Delta\alpha_{s\ crit}$).

5. A method as set forth in claim 1, wherein the crank angle range ($\Delta\alpha_F$) over which the filtered signal (I') is evaluated begins after a fixed crank angle difference ($\Delta\alpha_E$) after the detected signal (I) has reached the predetermined threshold value ($I_s$).

6. A method as set forth in claim 1, further comprising the steps of generating another detected signal related to a property of a fuel combustion in at least one other cylinder besides the at least one cylinder, filtering the other detected signal to form another filtered signal, investigating the other detected signal according to at least two preset conditions and, only if said preset conditions of the other detected signal are met, evaluating the other filtered signal over another predetermined crank angle range dependent on said preset conditions of the other detected signal (I) to determine an occurrence of knock, wherein one of the preset conditions is that the other detected signal has reached a predetermined threshold value; and the other is, that, after reaching said threshold value, during a predetermined time period, the other detected signal does not decrease by more than a first critical amount and then does not rise by more than a second critical amount.

7. A method of detecting known in an internal combustion engine having a plurality of cylinders, said method comprising the steps of generating a detected signal (I) related to a property of a fuel combustion in at least one cylinder; filtering the detected signal (I) to form a filtered signal (I') which may contain signal components that have characteristics associated with knock; investigating the course of the detected signal (I) to determine if the detected signal (I) meets a plurality of preset conditions; and, only if said preset conditions of the detected signal (I) are met, then evaluating the filtered signal (I') within a range of crank angles dependent on said preset conditions of the detected signal (I) to detect knock, wherein said preset conditions include the following:

that the detected signal (I) has reached a predetermined threshold value ($I_s$), that a maximum value ($I_{max}$) of the detected signal (I) is below a predetermined critical value ($I_{max\ crit}$), that an instant crank angle ($\alpha_s$), when the detected signal (I) reaches the threshold value ($I_s$), is less than a predetermined critical crank angle ($\alpha_{s\ crit}$), and that a crank angle difference ($\alpha\Delta_s$) equal to another instant crank angle at which the detected signal (I) returns to the threshold value minus the instant crank angle ($\alpha_s$) at which the detected signal (I) reaches the threshold value ($I_s$) is greater than a predetermined critical crank angle difference ($\Delta\alpha_{s\ crit}$), and that, after reaching said threshold value ($I_s$), during a predetermined time period ($\Delta t$) the detected signal (I) does not decrease by more than a first critical amount ($\Delta I_{AbC}$) and then does not rise by more than a second critical amount ($\Delta I_{AnC}$).

* * * * *